US012309402B2

(12) United States Patent
Meardi et al.

(10) Patent No.: US 12,309,402 B2
(45) Date of Patent: May 20, 2025

(54) SYSTEM AND METHOD FOR PERFORMING OBJECT ANALYSIS

(71) Applicant: V-NOVA INTERNATIONAL LIMITED, London (GB)

(72) Inventors: Guido Meardi, London (GB); Guendalina Cobianchi, London (GB); Stergios Poularakis, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 476 days.

(21) Appl. No.: 17/616,335

(22) PCT Filed: Jun. 5, 2020

(86) PCT No.: PCT/GB2020/051366
§ 371 (c)(1),
(2) Date: Dec. 3, 2021

(87) PCT Pub. No.: WO2020/245599
PCT Pub. Date: Dec. 10, 2020

(65) Prior Publication Data
US 2022/0327804 A1    Oct. 13, 2022

(30) Foreign Application Priority Data

Jun. 5, 2019    (GB) .................................. 1908045

(51) Int. Cl.
*H04N 19/30* (2014.01)
*B60L 53/30* (2019.01)
(Continued)

(52) U.S. Cl.
CPC .............. *H04N 19/30* (2014.11); *B60L 53/30* (2019.02); *B60L 53/50* (2019.02); *B60L 53/60* (2019.02);
(Continued)

(58) Field of Classification Search
CPC ......... H04N 19/30; B60L 53/60; B60L 53/50; B60L 53/30; G06V 10/25; G06V 10/96;
(Continued)

(56) References Cited

U.S. PATENT DOCUMENTS 10,878,272 B2 * 12/2020 Saito ....................... G06V 20/52
2010/0141763 A1 * 6/2010 Itoh ......................... G06V 20/52
348/143

(Continued)

FOREIGN PATENT DOCUMENTS

| CN | 107071451 | 8/2017 |
| CN | 109274941 | 1/2019 |

(Continued)

OTHER PUBLICATIONS

GB2313921.5 CSER dated Jan. 5, 2024.
(Continued)

*Primary Examiner* — Utpal D Shah
(74) *Attorney, Agent, or Firm* — Workman Nydegger

(57) ABSTRACT

There is provided a system that, when in operation, classifies one or more elements within an input signal, wherein the system: receives a compressed version of the input signal, wherein the compressed version comprises at least two sets of compressed data in a hierarchy, wherein each set of compressed data, when decoded, enables the signal to be reconstructed up to a respective level of quality; decodes the compressed version of the signal up to a first level of quality by decoding a first set of compressed data to generate a first reconstructed signal; performs a first classification operation on the first reconstructed signal; decodes the compressed version of the signal up to a second level of quality by decoding a second set of compressed data to generate a
(Continued)

second reconstructed signal; and performs one or more second classification operations on the second reconstructed signal.

20 Claims, 5 Drawing Sheets

(51) Int. Cl.
| | |
|---|---|
| B60L 53/50 | (2019.01) |
| B60L 53/60 | (2019.01) |
| G06V 10/25 | (2022.01) |
| G06V 10/764 | (2022.01) |
| G06V 10/82 | (2022.01) |
| G06V 10/94 | (2022.01) |
| G06V 10/96 | (2022.01) |
| G06V 20/40 | (2022.01) |
| G06V 40/16 | (2022.01) |

(52) U.S. Cl.
CPC ............ *G06V 10/25* (2022.01); *G06V 10/764* (2022.01); *G06V 10/82* (2022.01); *G06V 10/94* (2022.01); *G06V 10/95* (2022.01); *G06V 10/955* (2022.01); *G06V 10/96* (2022.01); *G06V 20/41* (2022.01); *G06V 40/161* (2022.01); *G06V 40/172* (2022.01)

(58) Field of Classification Search
CPC ........ G06V 10/82; G06V 10/94; G06V 20/41; G06V 10/95; G06V 10/955; G06V 10/764; G06V 40/172; G06V 40/161
See application file for complete search history.

(56) References Cited

U.S. PATENT DOCUMENTS

| | | | | |
|---|---|---|---|---|
| 2012/0114177 | A1* | 5/2012 | Adachi | G06V 40/10 |
| | | | | 382/103 |
| 2014/0023247 | A1* | 1/2014 | Kuwahara | H04N 19/132 |
| | | | | 382/118 |
| 2019/0034734 | A1* | 1/2019 | Yen | G06F 18/2413 |
| 2019/0188514 | A1* | 6/2019 | Saito | H04N 5/91 |
| 2020/0304802 | A1* | 9/2020 | Habibian | G06F 18/21 |

FOREIGN PATENT DOCUMENTS

| | | |
|---|---|---|
| CN | 109697408 A | 4/2019 |
| WO | WO2018037665 | 3/2018 |

OTHER PUBLICATIONS

International Search Report and Written Opinion for PCT/GB2020/051366 mailed on Aug. 17, 2020.

Andrej Karpathy et al.: "Large-Scale Video Classification with Convolutional Neural Networks", 2014 IEEE Conference on Computer Vision and Pattern Recognition, Jun. 1, 2014, pp. 1725-1732, XP055560536, DOI: 10.1109/CVPR.2014.223, ISBN: 978-1-4799-5118-5.

Muhammad Usman Yaseen et al.: "Cloud-based scalable object detection and classification in video streams", Future Generations Computer Systems, vol. 80, Mar. 1, 2018, pp. 286-297, XP055720744, NL, ISSN: 0167-739X, DOI: 10.1016/j.future.2017.02.003.

Shreyank N Gowda et al.: "ColorNet: Investigating the importance of color spaces for image classification", arxiv.org, Cornell University Library, 201 Olin Library Cornell University Ithaca, NY 14853, Feb. 1, 2019, XP081024151.

International Preliminary Report on Patentability received for PCT Patent Application No. PCT/GB2020/051366, mailed on Dec. 16, 2021, 10 pages.

Office Action received for UK Patent Application No. 2313921.5, mailed on Jan. 5, 2024, 5 pages.

* cited by examiner

SYSTEM AND METHOD FOR PERFORMING OBJECT ANALYSIS

CROSS-REFERENCE TO RELATED APPLICATIONS

The present application is a 371 US Nationalization of International Patent Application No. PCT/GB2020/051366, filed Jun. 5, 2020, which claims priority to UK Patent Application No. 1908045.6, filed Jun. 5, 2019, the entire disclosures of which are incorporated herein by reference.

TECHNICAL FIELD

The present disclosure relates to systems for performing object analysis, for example systems for performing object analysis in a sequence of images. Moreover, the present disclosure relates to methods for (namely methods of) operating aforesaid systems for performing object analysis in a sequence of images. Furthermore, the present disclosure relates to a computer program product comprising a non-transitory computer-readable storage medium having computer-readable instructions stored thereon, the computer-readable instructions being executable by a computerized device comprising processing hardware to execute the aforesaid method. The aforesaid systems employ automatic deep-learning analysis for performing scene/object detection, classification, recognition and tagging of complex signals such as, by way of a non-limiting example, image and video signals. For simplicity, the present disclosure focuses on a case of video signals, but people of technical skill are able to derive easily how the same concepts can be applied to automatic analysis of other types of signals than video signals.

BACKGROUND

Image recognition systems are known, for example as described in European patent application EP79300903.6; this application is well known in view of the EPO's Technical Board of Decision T208/84 (Vicom).

It will be appreciated that temporally evolving signals such as video signals are typically represented by means of a sequence of samples in time (for example, a sequence of samples in time at a rate of 60 Hz, or 60 samples per second), wherein each sample (for example, a video frame) comprises multiple colour (color) planes (for example RGB, YUV, HSV, and so forth), wherein each colour plane comprises a high number of picture elements (for example, 3840×2160 picture element, or circa 8 million pixels for an Ultra HD full-resolution plane), and wherein each picture element value is represented with a given bit depth (for example, 8 bit, 10 bit, and so forth). All in all, it will be appreciated that uncompressed video signals require an extremely high amount of bits per second to be communicated from one given location to another location, such as 12 Gigabits (i.e., 1.5 GB) for just a second of 4:2:2 UHD 10-bit video signal.

As aforementioned in EP Technical Board of Appeal decision T208/84, it is known to employ automatic analysis and classification of video signals for purposes of indexing, tagging, object recognition, OCR, and so forth; such automatic analysis and classification normally requires running multiple classification "services" on a given signal. These services are typically performed by independent nodes of a cluster computing system, where each independent node is equipped with suitable computing resources (for example, typically graphical processing units (GPUs) or field programmable gate arrays (FPGAs) that are optimized for deep learning computations). Mutually different services typically require mutually different quality levels for a same given signal: for example, some services (for example, face recognition) can be successfully performed by analyzing only one frame every ten frames of a given original video sequence, whereas other services (for example, scene detection to identify a goal in a football match) may require a finer temporal granularity; similarly, some services can be successfully performed only by using grayscale, while others may require all colour (color) planes to be available, and so forth.

In order to be able to provide mutually different video frames to mutually different services, known state of the art classification systems generate a common queue, wherein each frame is independently accessible. It will be appreciated that it would be impractical to distribute uncompressed image frames to multiple nodes in a cluster, because such distribution would likely generate one or more network bandwidth and/or memory bandwidth bottlenecks; most state-of-the-art solutions for distributing frame data compress each frame independently (for example, using a transcoder 110 as illustrated in FIG. 1). Even though any compression scheme could theoretically be applied, most implementations opt to employ JPEG, since more efficient formats such as JPEG2000, AVC-I, WebP, HEVC-I or AVIF would be impractically slow to decode, thereby generating a processing bottleneck. A schematic diagram illustrating a typical state-of-the-art scheme is provided in FIG. 1.

Referring to FIG. 1, video classification tasks are performed by fetching, for example by a scheduler 130, a plurality of frames from a queue 120, and then decoding the frames and transferring corresponding decoded frames to an operating memory of a processing chip (for example, a graphical processing unit (GPU) or field programmable gate array (FPGA)). The processing chip optionally pre-processes the decoded frames (for example, by downsampling them, turning them into grayscale images, and so forth), and then uses them as input data for one or more deep neural networks (for example, implemented in one or more nodes 140).

A notable limitation of traditional approaches to perform object analysis in image frames is that a resolution and a colour (color) space of decoded frames must be a minimum common denominator of the decoded frames that are to be used by all possible classification services of a given system, and that any variation from that minimum common denominator is costly in terms of one or more time consuming pre-processing operations (in addition to having to spend time to decode multiple frames at a higher resolution than what was required). When colours are important for purposes of object analysis in images, state of the art methods use the RGB 4:4:4 format as input of convolutional-neural-network detectors, consistently with using JPEG as an encoding format; it will be appreciated that, with the JPEG format, it is not feasible to work in a YUV colour space; this is an objective technical problem that the present disclosure seeks to address.

SUMMARY

The present disclosure seeks to provide an improved system for performing object analysis, for example for performing object analysis of objects included in sequences of images. Moreover, the present disclosure seeks to provide an improved method of (namely method for) using the aforesaid improved system for performing object analysis.

Furthermore, the present disclosure seeks to provide an improved software product that is executable on computing hardware for implementing the aforesaid improved method.

According to a first aspect, there is provided a method of (namely a method for) using a system to classify one or more elements within an input signal, wherein the method comprises:

receiving a compressed version of the input signal, wherein the compressed version comprises at least two sets of compressed data in a hierarchy, wherein each set of compressed data, when decoded, enables the signal to be reconstructed up to a respective level of quality;

decoding the compressed version of the signal up to a first level of quality by decoding a first set of compressed data to generate a first reconstructed signal;

performing a first classification operation on the first reconstructed signal;

decoding the compressed version of the signal up to a second level of quality by decoding a second set of compressed data to generate a second reconstructed signal; and performing one or more second classification operations on the second reconstructed signal.

The invention is of advantage in that using compressed data provided in a hierarchy enables the compressed version to be decoded very efficiently for classification purposes, wherein the compressed version is provided at the first quality for a first stage of classification, and compressed image is provided at the second quality for a second stage of classification, wherein selection of the second stage is dependent upon a classification implemented at the first stage.

Optionally, in the method, when performing the first classification operation, one or more regions of interest in the first reconstructed signal are identified, and the decoding of the compressed version of the signal up to a second level of quality is performed only for those one or more regions of interest.

Optionally, in the method, the first reconstructed signal is at a mutually same resolution as the second reconstructed signal.

Optionally, in the method, the first reconstructed signal is at a mutually different resolution as the second reconstructed signal.

Optionally, in the method, the first classification is performed on a first number of frames in the first reconstructed signal, and the one or more second classifications are performed on a second number of frames in the second reconstructed signal.

Optionally in the method, the first classification is performed over a full frame in the first reconstructed signal, and the one or more second classifications are performed over a portion of a frame in the second reconstructed signal.

Optionally, in the method, the first classification is performed on a first number of colour planes in the first reconstructed signal, and the one or more second classifications are performed on at least a second number of colour planes in the second reconstructed signal.

More optionally, in the method, the first number of colour planes corresponds to all the planes in the first reconstructed signal, and wherein the second number of colour planes corresponds to a subset of the colour planes in the second reconstructed signal.

More optionally, in the method, the one or more second classifications are performed also on at least a third number of colour planes in the first reconstructed signal, wherein the colour planes included in the second number of colour planes are mutually different from the colour planes included in the third number of colour planes.

More optionally, in the method, the first number of colour planes corresponds to three and includes planes Y, U and V, the second number of colour planes includes plane Y, and wherein the third number of colour planes corresponds includes colour planes U and V.

More optionally, in the method, a signal comprises multiple colour planes (YUV), and each colour plane is either a luma plane (Y) or a chroma plane (U, V).

Optionally, the method further comprises:

decoding the compressed version of the signal up to a third level of quality by decoding a third set of compressed data to generate a third reconstructed signal; and performing one or more third classification operations on the third reconstructed signal.

More optionally, in the method:

the first classification is performed on a first number of colour planes in the first reconstructed signal, and the one or more second classifications are performed on at least a second number of colour planes in the second reconstructed signal;

the one or more second classifications are performed also on at least a third number of colour planes in the first reconstructed signal, wherein the colour planes included in the second number of colour planes is mutually different from the planes included in the third number of colour planes; and the one or more third classifications are performed on at least a fourth number of colour planes in the third reconstructed signal.

More optionally, in the method, the third reconstructed signal corresponds to a portion of the input signal. Yet more optionally, in the method, the portion corresponds to a region of interest of the input signal.

Optionally, in the method, steps of receiving, decoding and performing are all performed within a same processing unit (for example a same graphics processing unit (GPU)).

Optionally, in the method, the first level of quality (for example, defined in terms of image resolution) is lower than the second level of quality.

Optionally, in the method, the second reconstructed signal is generated partially based also on the first reconstructed signal.

Optionally, in the method, a reconstructed signal corresponds to a portion of the input signal.

Optionally, in the method, the first classification, one or more second classifications and one or more third classifications are organized in a hierarchical manner, so that the first classification is a coarse classification of some elements in the input signal, and either the one or more second classifications or the one or more third classifications further refine the coarse classification of elements of the elements in the input signal.

More optionally, the method further comprises:

based on the coarse classification, decoding only those portions of the second set of compressed data which are determined to require a further classification, and generating the second reconstructed signal based on those decoded portions.

Optionally, in the method, the classifications are performed using one or more neural network detectors (for example, a plurality of neural network detectors). Optionally, the neural network detectors include a data normalization stage and a subsequent data comparison stage. Optionally, the neural network detectors are implemented in digital hardware (for example, in a field programmable gate array (FPGA)), in computing hardware configured to execute a software product to implement neural network functionality, or a combination of both.

According to a second aspect, there is provided a method of (namely a method for) classifying one or more elements within an input signal, the method comprising:

performing a first classification sub-task of a classification task on a first version of the input signal;

performing one or more second classification sub-tasks of the classification task on a second version of the input signal, wherein the second version generated is based on an output of the first classification sub-task.

Optionally, the method further comprises:

performing one or more third classification sub-tasks of the classification task on a third version of the input signal, wherein the third version generated is based on an output of the one or more second classification-sub-tasks.

Optionally, in the method, based on the output of the first classification sub-task, the second version comprises only a portion of the input signal.

Optionally, in the method, based on the output of the first classification sub-task, the second version comprises only a subset of the colour planes which form the input signal.

Optionally, in the method, each version corresponds to a decoded version of the input signal, wherein each decoded version is mutually different from other versions based on one or more of the following: resolution, portion of the input signal to which it refers, number of planes used.

According to a third aspect, there is provided a method of (namely a method for) reconfiguring a field programmable gate array (FPGA) classifying one or more elements within an input signal, the method comprising:

configuring the FPGA with a first decoding process to decode a compressed version of the input signal up to a first level of quality;

decoding a first set of compressed data to generate a first reconstructed signal;

configuring the FPGA with a first classification process to detect first elements in the first reconstructed signal; and performing the first classification process on the first reconstructed signal.

Optionally, the method further comprises:

configuring the FPGA with a second decoding process to decode a compressed version of the input signal up to a second level of quality;

decoding a second set of compressed data to generate a second reconstructed signal;

configuring the FPGA with a second classification process to detect second elements in the second reconstructed signal; and performing the second classification process on the second reconstructed signal.

Optionally, in the method of the first aspect and/or the second aspect, decoding is performed on a computer processing unit (CPU) and classification is performed on a graphics processing unit (GPU).

According to a third aspect, there is provided a method of (namely a method for) classifying one or more elements within a plurality of input signals, the method comprising:

receiving a compressed version of the plurality of input signals, wherein the compressed version comprises at least two sets of compressed data in a hierarchy for each of the plurality of input signals, wherein each set of compressed data, when decoded, enables the respective one of the plurality of input signals to be reconstructed up to a respective level of quality;

decoding the compressed version of a first set of the plurality of input signals up to a first level of quality by decoding a first set of compressed data for each of the signal in the first set to generate a first plurality of reconstructed signals;

performing a first classification operation on the first plurality of reconstructed signals;

decoding the compressed version of a second set of the plurality of input signals up to a second level of quality by decoding a second set of compressed data for each of the signal in the second set to generate a second plurality of reconstructed signals; and performing one or more second classification operations on the second plurality of reconstructed signals.

Optionally, in the method, the first plurality of reconstructed signals comprises a first number of colour planes, and the second plurality of reconstructed signals comprises a second number of colour planes. More optionally, in the method, the first number of colour planes corresponds to three and includes planes Y, U and V, the second number of colour planes corresponds to 1 and includes a plane Y.

Optionally, in the method, the decoding of the compressed version of the signal up to a second level of quality is performed only for regions of interest identified in a previously performed classification.

Optionally, in the method, when performing the first classification operation, one or more regions of interest in the first reconstructed signal are identified, and the decoding of the compressed version of the signal up to a second level of quality is performed only for those regions of interest.

Optionally, in the method, the first and/or the second version of the input signal comprises compressed data.

According to a fourth aspect, there is provided a system that is configured to perform a method of any one of the first, second and third aspects.

According to a fifth aspect, there is provided a field programmable gate array (FPGA) that is configured to perform a method of any one of the first, second and third aspects.

According to a sixth aspect, there is provided a computer program product comprising a non-transitory computer-readable storage medium having computer-readable instructions stored thereon, the computer-readable instructions being executable by a computerized device comprising processing hardware to execute the aforementioned methods of any one of the first, second and third aspects.

Embodiments of the present disclosure substantially eliminate or at least partially address the aforementioned problems in the prior art, and enable more efficient and more rapid analysis of objects present in a sequence of images.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
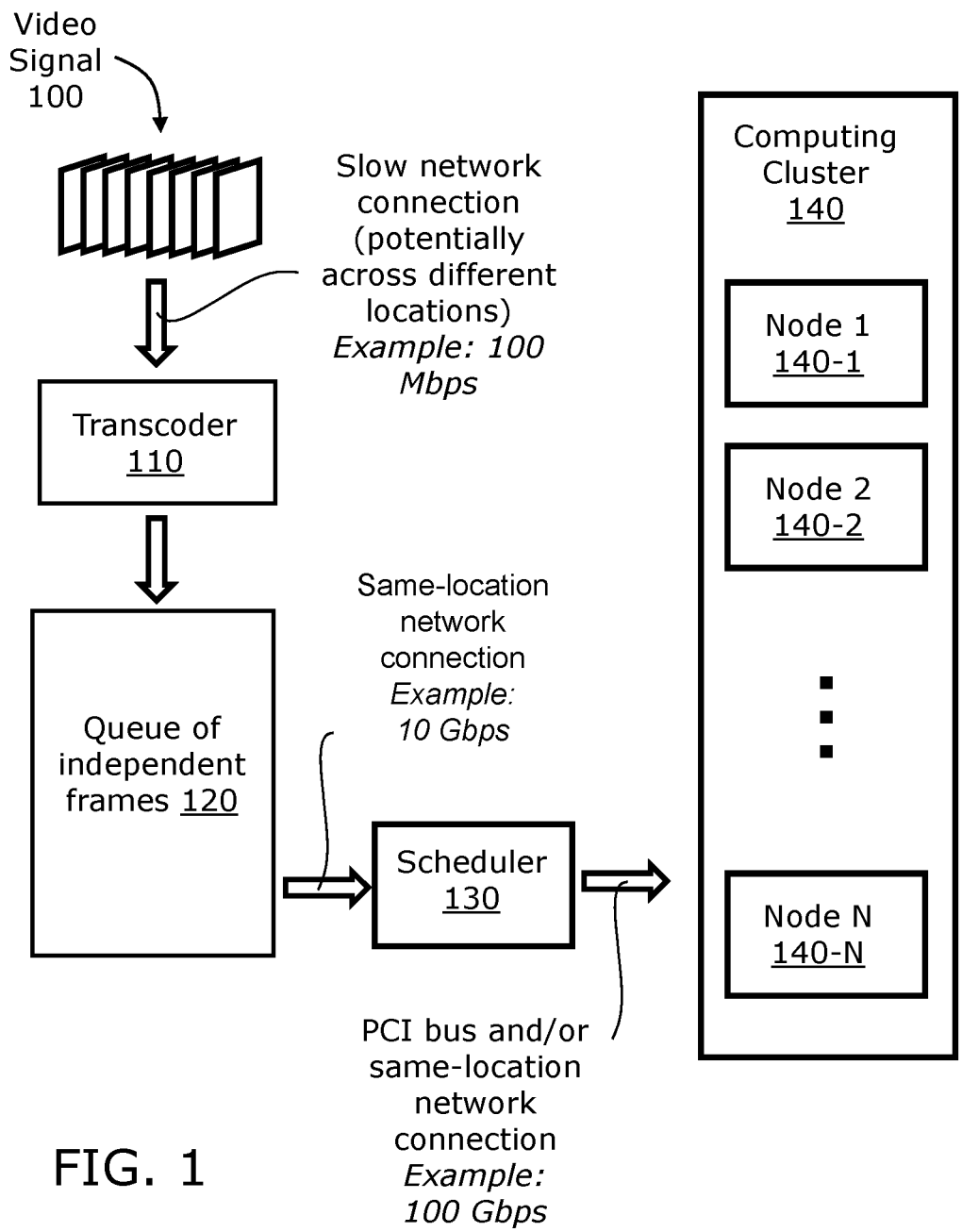
FIG. 1 is a schematic illustration of known system for analyzing and classifying objects included in image frames.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

According to first non-limiting embodiments, there is provided a classification method that compresses a sequence of frames, for example image frames, using a coding format suitable for parallel and Region-of-Interest ("RoI") decoding, thereby generating compressed data for the sequence. In a preferred embodiment, such a coding format is a hierarchical coding format, preferably a tier-based coding format. The compressed data for the sequence is then beneficially transferred, still in compressed form, to an operating memory of a processor node responsible for performing a classification task. Depending on the classification task to be performed, the processor node optionally chooses to decode only a relevant part of the compressed data for the sequence. The same compressed data is optionally used (either by the same or by distinct processing nodes, depending on the embodiment) for multiple classification tasks, using mutually different decoded data (for example, by way of non-limiting examples, different subsets of frames of the sequence, different image resolutions, and so forth) as input for one or more artificial intelligence (AI) detectors, for example neural network detectors but not limited thereto.

In a non-limiting example embodiment, the processor nodes decode frames in the sequence only up to a first level of quality (for example, at a 480×270 resolution), wherein the first level of quality is lower than a highest level of quality (for example, at a 1920×1080 resolution). In another non-limiting example embodiment, the processor node decodes frames in the sequence only in a YUV format (namely, thereby avoiding a need to perform a YUV-to-RGB conversion step) and feeds subsampled chroma planes as input to artificial intelligence (AI) detectors, for example neural network detectors, thus reducing the number of inputs to AI detectors, for example the neural network detectors. In another non-limiting example embodiment, the processor node only decodes Y (namely, luma) colour planes and provides luminance-only information as input to the AI detectors, for example neural network detectors, thus significantly reducing the number of inputs to the AI detectors, for example to the neural network detectors. In another non-limiting example, the processor node only decodes specified Region of Interests (RoI) of specified frames, again significantly reducing the number of inputs to the AI detectors, for example neural network detectors.

In embodiments of the present disclosure, use of YUV information is feasible and therefore processing can be done directly in YUV, for example for performing classification operations. Using YUV formats with chroma sub-sampling (for example, YUV 4:2:2 or YUV 4:2:0) would limit the number of pixels analyzed, thereby substantially increasing an efficiency of the embodiments. It will be appreciated that video sources tend to be either 4:2:2 (in case of high quality mezzanine) or 4:2:0 (more often, in case of compressed H.264 video), so YUV formats with chroma sub-sampling are more closely related to the source video, thus also avoiding any loss in colour format conversion in embodiments of the present disclosure. In addition, a need to decode frames outside a processing chip (for example, a graphics processing unit (GPU) chip or field programmable gate array (FPGA) chip) and then transfer a corresponding series of uncompressed frames to an operating memory makes high resolutions extremely expensive in terms of memory bandwidth to process (and thus expensive in overall processing times); embodiments of the present disclosure circumvent this objective technical problem, namely limitations.

Unique innovative methods described in the present disclosure allow deep-learning systems to bypass aforesaid limitations, by more effectively managing memory bandwidth bottlenecks and by allowing for automatic classification tasks to be performed efficiently on high resolution signals. In particular, embodiments described herein allow substantial reductions in overall processing time by leveraging hierarchical compression technologies to redefine the whole classification process: by using a massively parallel tier-based compression format, methods described herein transfer to the operating memory of the processing chip the maximum possible quality frames in compressed form (rather than decoding them and transferring the corresponding uncompressed renditions), and then perform decoding only of the region of interests (RoI), levels of quality and color planes of the frames that are deemed important to one or more specific classification tasks. Importantly, the decoding of lower levels of quality and/or specific regions of interest (RoI) at high resolution are optionally performed entirely on the processing chip (namely, GPU or FPGA) and does not require to first fully decode a given frame and then perform crop/rescale operations. A possibility to decode swiftly much smaller portions of the overall data (namely, within orders of magnitude less processing time than it would take to fully decode and then crop/rescale) also allows a single classification task to be split into multiple deep learning tasks with progressive levels of refinement, allowing for simplified neural network topologies to be employed while concurrently improving overall classification accuracy.

Figure 2:
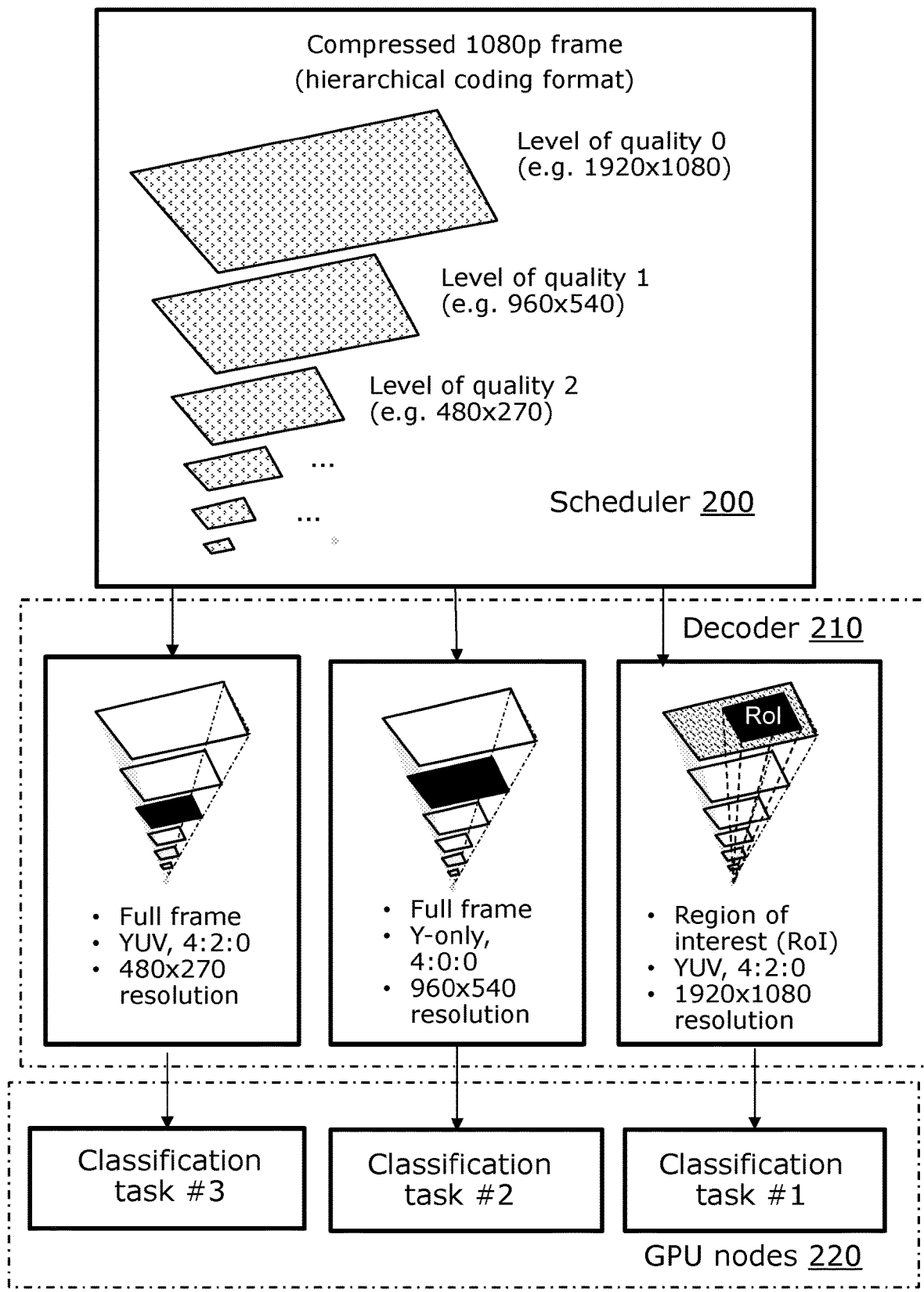
FIGS. 2 to 4 are schematic illustration of systems pursuant to the present disclosure for analyzing and classifying objects included in image frames.

Referring to FIG. 2, there is depicted an example of an embodiment according to the present disclosure. In a system, a compressed image frame is fed to GPU nodes 220 by a scheduler 200, for example via a decoder 210 (although the decoder 210 can be an integral function of the GPU nodes 220). The image frame is encoded in a hierarchical structure so that each layer of the structure corresponds to a different level of quality, for example a different resolution. The GPU nodes 220 are configured to perform one or more classification tasks over the image frame. In particular, a first node performs a first classification task #3 on a first level of quality of the decoded frame, for example a low resolution version of the image frame (namely, 480×270). The first level may be processed using all the colour planes YUV. A second node (which could be also a second instance of the first node once reconfigured) performs a second classification task #2 on a second level of quality of the decoded frame, for example an intermediate resolution version of the frame (for example, 960×540). The second level is optionally processed using only the Y colour plane. In this case, only the Y plane is decoded, even though the compressed frame contains all the planes YUV. A third node performs a third classification task #1 on a third level of quality of the decoded frame, for example a top resolution version of the frame (for example, 1920×1080). The third level may be processed using all the colour planes YUV. The third classification is optionally performed only on a selected region-of-interest (RoI) of the frame, for example an RoI identified during a previous classification task, thus reducing an amount of information to be processed.

In non-limiting example embodiments, the scheduler 200 optionally transfers to a given processor node, for example a given GPU node 220, the compression data, and the processor node optionally uses the same compression data multiple times, each time decoding different portions and/or levels of quality of the signal based on a given classification task to be performed. In a non-limiting embodiment, the decoded portions used for a previous classification task, still in operating memory of the given processing node, can be reused as a baseline for a higher resolution decoding (or region-of-interest decoding) of a subsequent classification task.

In other non-limiting example embodiments, the scheduler 200 optionally spreads the classification computation on multiple processing nodes in a cluster and transfers to each processing node only the portion of the compressed data that it needs in order to perform the task.

According to second non-limiting embodiments, the aforesaid system employs a classification method that efficiently leverages a possibility of fast partial decoding to split a given overall classification task into a hierarchy of subsequent fast classification sub-tasks comprising at least two sub-tasks. A first classification task is performed by decoding all of the image frames included in a sequence of image frames, but at a very low level of quality (namely, at a very low resolution): the purpose of this task, that is executed extremely fast due to the low pixel count associated with the low level of quality, is to detect those portions of the video where for one or more given classification tasks no further processing is necessary and to detect and localize regions of interest where for one or more given classification tasks further processing is necessary, and produce metadata to direct better the subsequent classification sub-tasks that are necessary. A second classification task, based at least in part on the results of the first classification task (for example, identification of one or more specified region of interests (RoI) to be decoded for the purpose of the second classification task), is performed on input data obtained by decoding specified regions of interests of a subset of the image frames in the sequence of image frames. In such a way, the second classification task is also characterized by a limited number of pixels as input, but the selected regions of interest (RoI) are optionally decoded at a maximum available resolution, with consequent positive impact (namely benefit) on classification accuracy.

Figure 3:
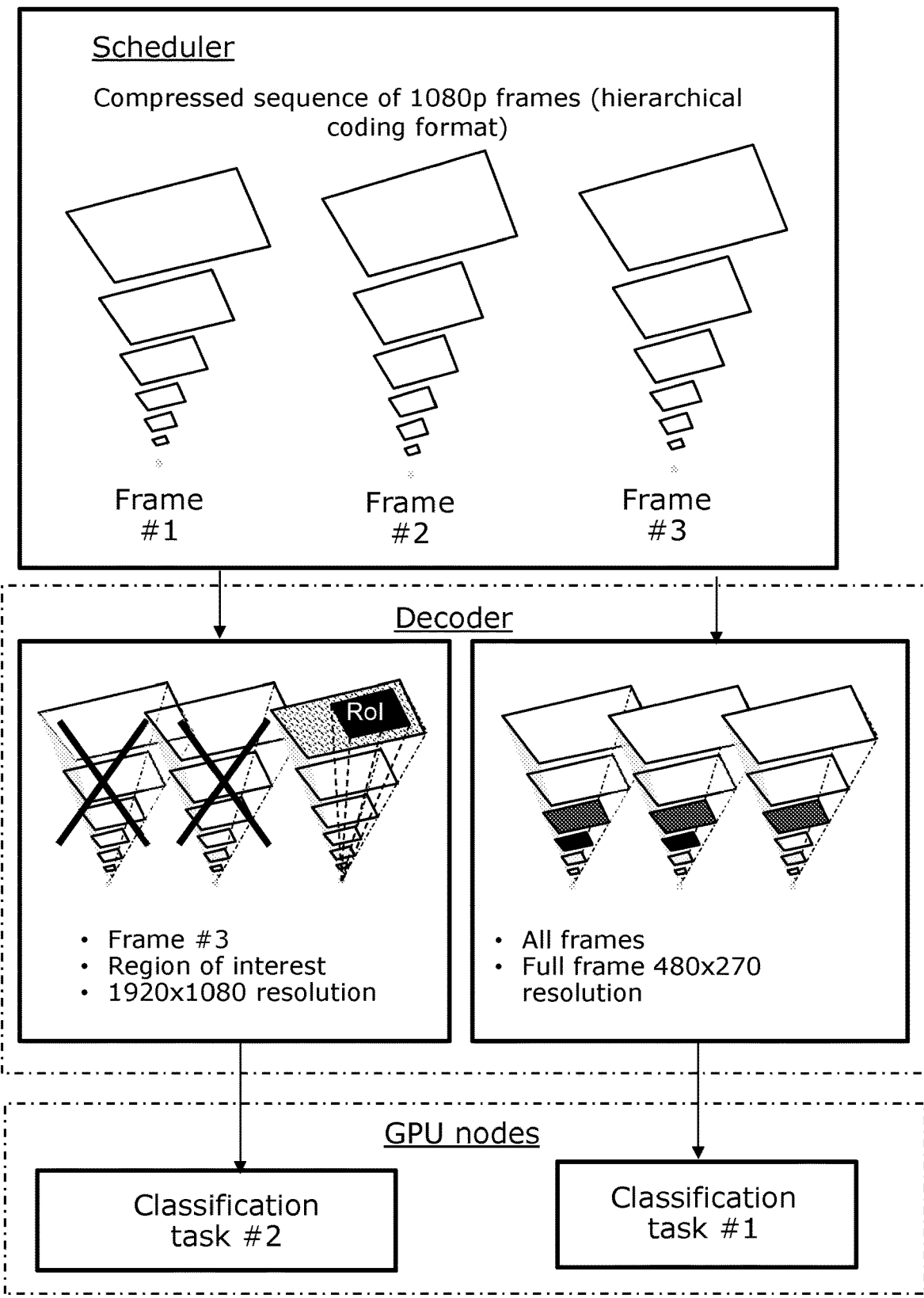

Referring next to FIG. 3, there is shown an illustration of an embodiment according to the present disclosure. A compressed series of video frames is fed via a scheduler to a plurality of GPU nodes. The series of video frames are encoded in a hierarchical structure so that each layer of the structure corresponds to a different level of quality, for example corresponds to a mutually different resolution. The GPU nodes are configured to perform one or more classification tasks over the series of video frames. In particular, a first node performs a first classification task on a first level of quality of series of decoded video frames, for example a low resolution version of the frame (for example, 480×270). The first level is optionally processed using all the colour planes YUV. A second node (which could be also a second instance of the first node once reconfigured) performs a second classification task on a second level of quality of a subset of the series of decoded video frames, for example only one of the video frames. The task is optionally performed on a top resolution version of the frame (for example, 1920×1080). The second level is optionally processed using all the colour planes YUV. The second classification is optionally performed only on a selected region-of-interest (RoI) of the frame, for example an RoI identified during a previous classification task, thus reducing the amount of information to be processed.

In a non-limiting embodiment, a same first-level classification sub-task is able to stem multiple second-level classification sub-tasks performed in parallel by multiple processing nodes belonging in a cluster. Only the relevant part of the compressed data is transferred to each processing node.

Figure 5:
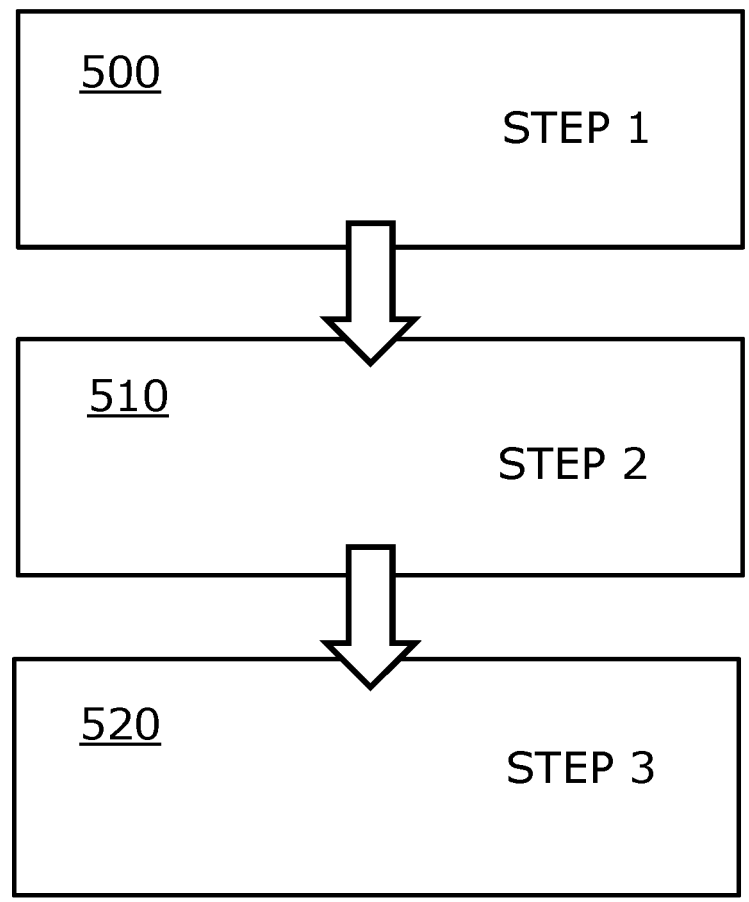
FIG. 5 is a flow chart of steps of a method of (namely, a method for) analyzing and classifying objects included in image frames.

Referring next to FIG. 5, in a non-limiting embodiment, a classification task is split into three sub-tasks. In a first step 500, a first-level "coarse classification" is performed by quickly detecting, based on a rendition of the signal at a low level of quality, those portions of the video sequence where further processing (for example, one or more second-level detections) is, alternatively is not, required. For example, this "coarse classification" can be done to detect a sequence of frames where there is little or no chance of finding a goal within a football match, so that those frames will be excluded from further analysis, thereby reducing computing effort required for classification tasks. In a second step 510, for each detection task, for the portions of the video sequences where the first-level coarse classification identified a potential for detection, a second-level detection task is triggered, operating on a subset of the frames used for the first-level coarse classification, but at a higher level of quality (for example at a higher image resolution). Each second-level detection task, which is optionally performed at a higher level of quality compared to the first pass, is aimed at detecting and localizing regions of interest (RoI) of specific frames that should be considered for recognition. In a third step 520, when second-level detection is successful, one or more third-level recognition sub-tasks are triggered, operating on the specified regions of interest (RoI) of the specified frames, decoded at a higher level of quality.

Figure 4:
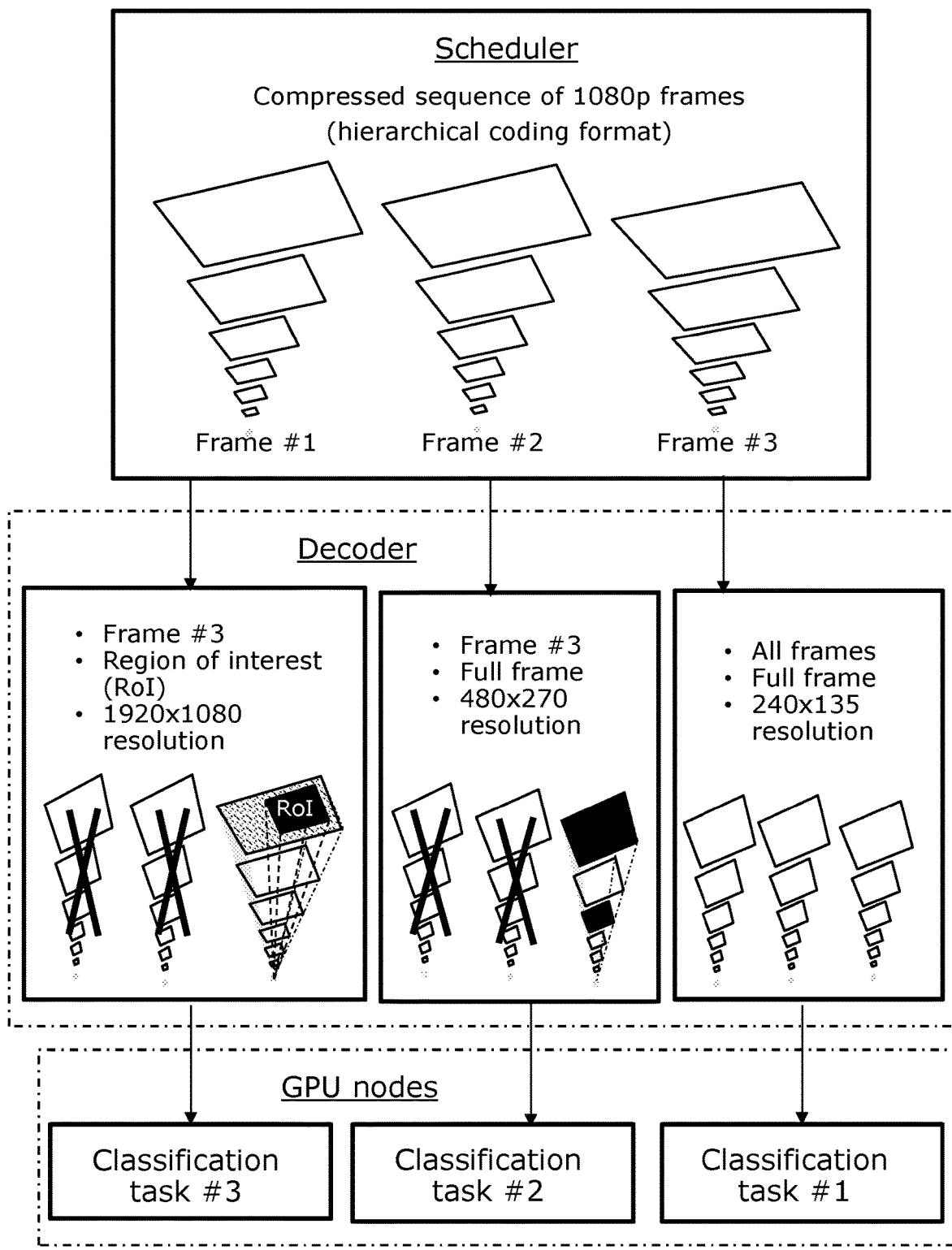

Referring next to FIG. 4, there is illustrated an example of an embodiment according to the present disclosure. A compressed series of video frames is fed via a scheduler to a plurality of GPU nodes. The series of video frames are encoded in a hierarchical structure so that each layer of the structure corresponds to a mutually different level of quality, for example a mutually different resolution. The GPU nodes are configured to perform one or more classification tasks over the series of video frames. In particular, a first node performs a first classification task on a first level of quality of a series of decoded video frames, for example a low-resolution version of the frame (for example, 240×135). The first level is optionally processed using all the colour planes YUV. A second node (which could be also a second instance of the first node once reconfigured) performs a second classification task on a second level of quality of a subset of the series of decoded video frames, for example on only one of the video frames. The task is optionally performed on an intermediate resolution version of the frame (for example, 480×270). A third node (which could be also a second instance of the first node once reconfigured) performs a third classification task on a third level of quality of a subset of the series of decoded video frames, for example only one of the video frames. The task is optionally performed on a top resolution version of the frame (for example, 1920×1080). The third level is optionally processed using all or only some of the colour planes YUV. The third classification is optionally performed only on a selected region-of-interest (RoI) of the frame, for example an RoI identified during a previous classification task, thus reducing an amount of information to be processed.

In a non-limiting example embodiment, a classification system is configured to perform face detection and recognition, for example human face detection and recognition. The system receives an input video and, for each given time interval, compresses a sequence of frames of the input video at a source resolution in 4:2:0 YUV using a hierarchical tier-based intra-only compression format, producing compressed data for the sequence of frames. The compressed data is sent to a processing node, along with a description of a classification task that is required; for example, the compressed data is communicated via a data communication network, for example the Internet®. The processor node processes the compressed data and produces renditions of the frames in the sequence at a first (low) level of quality. The decoded renditions are placed (stored) next to one another in the operating memory and given as input to a first artificial intelligence (AI) detector, for example a neural network detector. The first neural network of the neural network detector performs face detection and identifies for each detected face multiple regions of interest (RoI) to be used for recognition, each region of interest belonging to a different frame. For each face to be recognized, the processing node performs region-of-interest (RoI) decoding for the identified regions in the indicated frames, places the decoded region-of-interest next to one another in the operating memory and feeds them as input to a second neural network of the neural network detector, the second neural network performing recognition. The process is repeated for each face to be recognized. In other non-limiting embodiments, face recognitions tasks are performed in parallel (namely temporally concurrently) by multiple processing nodes in a cluster, which may, alternatively may not, comprise the processing node that performed the detection task. In other non-limiting embodiments, the same approach described for face recognition can be also used for object/landmark/topic/label recognition, brand recognition, emotions recognition, and text/OCR recognition, for example vehicle number plate detection, vehicle detection in complex traffic situations, self-drive vehicle road environments, and so forth.

In a non-limiting example embodiment, instead of using RGB colour data as input for the artificial intelligence (AI) detectors, for example neural network detectors, that perform classification functions, the processing node stops the decoding once there are obtained the YUV planes, and feeds those planes as input to the AI detectors. In other non-limiting example embodiments, the U and V planes are decoded at lower (including much lower) levels of quality (for example lower resolution) with respect to the Y plane, further reducing the number of inputs to the AI detectors, for example neural network detectors, and thus the overall processing time.

According to third non-limiting embodiments, the processing node analyses data that is still in compressed form, or only partially decoded. In these embodiments, the tiered-based hierarchical coding format enables each signal (namely, by way of non-limiting example, image frame) to be decoded with subsequent operations of reconstructing the signal at a first (lower) level of quality, then predicting a preliminary rendition of the signal at a second (next higher) level of quality, then parallel decoding residual data to amend the preliminary rendition of the signal at the second level of quality, then combining the preliminary rendition and the residual data to reconstruct the rendition of the signal at the second level of quality, then predicting a preliminary rendition of the signal at a third (next higher) level of quality, then parallel decoding the residual data to amend the preliminary rendition of the signal at the third level of quality, and so forth. Notably, all non-predictable information lies in the hierarchical layers (also called "echelons") of residual data, which contain the data that a decoder would not be able to deduct on its own based on an availability of just the lower echelons of data. In addition, according to these embodiments, the residual data is structured in tiles of data (for example, by way of a non-limiting embodiment, by using quantized transformed coefficients) that can be independently decoded to reconstruct residual data for each given tile: as such, all the information of pixels in a given tile is contained in the quantized transformed coefficients. According to these embodiments, additional decoding time is saved by feeding to the AI detectors, for example neural network detectors, data that is still partially compressed (in part or in full), rather than corresponding final decoded pixel planes.

In a non-limiting example embodiment, the classification task requires to process the signal at a given level of quality. Instead of fully decoding the signal up to the given level of quality, the processing unit decodes the signal up to a first (for example, next lower) level of quality, and then entropy decodes the transformed coefficients that would be necessary to reconstruct the echelon of residual data at the given level of quality. Instead of the full signal at the given of quality, the signal at the first level of quality and the echelons of transformed coefficients are provided as input of the AI detectors, for example neural network detectors. In such a non-limiting example embodiment, the number of inputs to the AI detectors, for example neural network detectors, and the information content is the same as what it would have been with a full decoding of the signal at the given level of quality; however, avoiding a need to implement the decoding process saves a majority of processing time and is highly technically advantageous.

According to fourth non-limiting embodiments, the processing nodes use field programmable gate array (FPGA) devices that are reconfigurable in real-time via dynamic and partial reconfiguration. In these embodiments, the subsequent operations of partial decoding, hierarchical classification, region-of-interest (RoI) decoding at higher resolution and classification refinement are performed by loading the FPGA device with subsequently different logic. For example, the FPGA device includes data memory into which parameters representative of one or more objects are loaded; the FPGA also has data memory into which an image at a given level of quality is loaded. The FPGA normalizes the image at the given level of quality, and then performs a correlation of the parameters representative of one or more objects to portions of the normalized image; when such a correlation provides a correlation output that is greater than a detection threshold, the one or more objects are deemed to be present in the normalized image. Thus, algorithms in a form of a Kalman filter are beneficially employed. The aforesaid normalization can be taught to the FPGA by use of a learning process.

In a non-limiting example embodiment, the processing node receives a classification task and a sequence of signal samples (for example, by way of non-limiting example, video frames) in compressed form, which are stored in operating memory. The processing node loads the FPGA device with a first decoder able to decode swiftly the compressed data into a rendition of the sequence at a first level of quality. The processing node then performs the decoding task and organizes the decoded data in the operating memory so as to feed it to a first AI detector, for example employing a neural network. The processing node then loads the FPGA device so as to perform a first neural network classification. The processing node then performs the classification task and writes the outputs to operating memory. Based on the outputs of the first classification task, the processing node then loads the FPGA device with a second decoder able to decode swiftly the compressed data into a second input for a second AI detector, for example employing a neural network. The processing node then performs the second decoding task, and then organizes the decoded data in the operating memory so as to feed it to a second AI detector, for example employing a neural network. In a non-limiting embodiment, the second decoding operation comprises leveraging some of the decoded outputs of the first decoding operation that were still in operating memory. In other non-limiting embodiments, the second decoding operation comprises region of interest (RoI) decoding for one or more of the frames. In other non-limiting embodiments, mutually different chroma planes are optionally decoded at mutually different levels of quality. In other non-limiting embodiments, the second decoding operation decodes at a higher level of quality only a subset of the frames that were decoded in the first decoding operation. Based on the outputs of the first classification task, the processing node then loads the FPGA device so as to perform a second AI classification, for example a second neural network classification. The processing node then performs the classification task and writes the outputs to operating memory.

In other non-limiting example embodiments, more than two subsequent classification tasks are performed, adopting the same scheme described above. In one of such embodiments, the first classification task is executed on the whole sequence at a relatively low level of quality, and is common to a series of subsequent classification tasks, which are then executed in parallel (namely, temporally concurrently) on distinct processing nodes in a cluster, each receiving only the part of the compressed data that it needs to perform the task.

In another non-limiting embodiment, the classifications tasks may be performed using a graphical processing unit (GPU) whilst the decoding may be performed using a computer processing unit (CPU). The GPU can, for example, be hardware-based, enabling it to achieve a very high image processing rate, wherein the CPU executes software, allowing for a high degree of reconfigurability for performing various classification tasks in the GPU.

The above description and embodiments provide efficient solutions to the problem of classifying elements within an input signal (for example, a video signal) in an efficient manner. In general, the solutions provided herein rely on the use of a hierarchical coding algorithm to split the broader classification problem in one or more sub-tasks which can each be done at a mutually different level of the hierarchy, thus resulting in more accurate and faster detection of objects present within images.

In particular, if it is not possible to decode without getting out of the GPU (where the classification algorithms are typically run), it would be impossible to keep decoding outside of the GPU and then transferring uncompressed data.

In particular, without the possibility to selectively decode portions of the signal (for example, a lower resolution of the signal, or a portion or region-of-interest of the signal, or certain colour space), it would be prohibitively time consuming every time to decode at maximum resolution and/or then rescale at maximum resolution to whatever desired size/crop. For example, the process of decoding, transferring and rescaling 20 UHD frames would require between 350 milliseconds (ms) and 400 ms; using a hierarchical code with the above characteristics (for example, processing of classification tasks at different resolutions, processing only portions of the signal, and so forth) would require circa 30 milliseconds only.

Furthermore, the same compressed data can be re-used for multiple classification tasks, each time potentially using:
  (a) a different number of frames;
  (b) different resolutions;
  (c) full-frame vs. Region-of-Interest (RoI);
  (d) chroma planes at mutually different resolutions vs. luma plane; for example, a first pass is beneficially executed with all frames at a low level of quality (and/or resolution), YUV 4:2:0; a second pass with just a few frames at higher level of quality (and/or resolution) for only luma, chroma planes still at low level of quality (and/or resolution); a third pass only on selected frames with three regions of interest at maximum level of quality (and/or resolution) using YUV 4:2:0.

Further efficiency is achievable in embodiments of the present disclosure by using partially decoded frames (for example, up to a certain resolution) for subsequent decoding at higher level of quality; for example, a decoded 270p frame can be reused to decode the extra 2 levels of quality (LoQs) to decode full 1080p, or a region of interest (RoI) of a 1080p frame; "p" here refers to image pixels.

Furthermore, thanks to a possibility for on-the-fly flexible decoding of whatever frame/RoI at whatever resolution, the classification operation can be performed in a hierarchy of subsequent classification tasks. The first-level "coarse classification" can be used to determine very quickly what portions of the video do NOT deserve further processing (namely, it is feasible very quickly to eliminate large portions of the data, wherein such elimination is especially useful not only to reduce times and costs of offline archive tagging, but also to reduce the average costs of live video processing).

The above approach, namely using systems, algorithms and methods of the present disclosure, can be executed on a field programmable gate array (FPGA), thereby leveraging dynamic and partial reconfiguration to provide advanced object analysis and detection in image data. Dynamic and partial FPGA reconfiguration are existing options, but they are rarely used. In embodiments of the present invention, the various steps are obviously suitable for dynamic reconfiguration: first decode with a hierarchical codec, then perform a first neural network, then again decode with a hierarchical codec in a different way, then perform a second neural network, and so forth. Reconfiguration times in the order of a few milliseconds (for example, <50 milliseconds) are perfectly acceptable for many practical use applications, and overall approaches of the present disclosure are susceptible to enabling processing of a one second duration of UHD video within less than 100 milliseconds. Such improvement is a major technical effect with great commercial significance in industrial applications, for example security systems, robotics, defence equipment, traffic control systems, self-driving vehicles, automated farming equipment, missile guidance systems and so forth.

Furthermore, a same first-level classification can stem multiple second-level classifications on multiple different processing nodes in a cluster. Only the relevant portion of the compressed data is dispatched, there reducing (for example, minimizing) memory bandwidth and transfer times.

Additionally, data given as input to the neural network detectors can also be only partially decoded (for example, "indexing in compressed space"); reducing a degree of decoding required also reduces computing effort required for implementing embodiments of the present disclosure. For example:
- (a) Stop at YUV (with subsampled U and V planes) instead of RGB;
- (b) Stop at YUV with even lower levels of quality (LoQs) for U and V (normally, very coarse chroma information as even lower LoQs);
- (c) Only Y plane (equivalent of grayscale, but does not require to first decode RGB and then turn into grayscale);
- (d) Only a lower resolution decoded image along with the transformed coefficients of higher resolution (thus saving on a relatively time-consuming upsampling operation, as well as residual transform and residual add operations).

One potential hierarchical coding algorithm that is optionally used in embodiments of the present disclosure is a proprietary Perseus™ Pro product from V-Nova International Ltd. (which has byte-stream format elements that allow for partial and parallel decoding, and that uses a static entropy decoding rather than an adaptive entropy decoding); a proprietary Perseus™ Pro product from V-Nova International Ltd is also described in the following US patent applications, which are hereby incorporated by reference:

| | | | | |
|---|---|---|---|---|
| 13/188,188, | 13/188,201, | 13/188,207, | 13/188,220, | 13/188,226, |
| 13/352,944, | 13/188,237, | 13/303,554, | 13/744,808, | 13/893,665, |
| 13/893,669, | 13/894,417, | 13/893,672, | 13/893,677, | 15/783,204, |
| 15/779,193, | 16/077,828, | 16/103,784, | 16/078,352, | 16/126,939, |
| 16/252,357, | 16/252,362, | 16/324,433, | 16/324,431, | 16/295,847, |
| 16/295,851, | 16/295,854 | | | | as well as in the following PCT patent applications, which are hereby incorporated by reference

| | | |
|---|---|---|
| PCT/GB2017/053716, | PCT/EP2018/075603, | PCT/EP2018/082350, |
| PCT/GB2018/053551, | PCT/GB2018/053556, | PCT/GB2018/053553, |
| PCT/GB2019/050122, | PCT/GB2018/053552, | PCT/GB2019/051104, |
| PCT/GB2018/053546, | PCT/GB2018/053555, | PCT/GB2018/053547, |
| PCT/GB2018/053554, | PCT/GB2018/053548. | |

Embodiments of the present disclosure are beneficially implemented using contemporary FPGAs, for example using Intel Inc. devices such as Intel® Agilex™ F-Series FPGAs; these FPGAs provide transceiver support up to 58 Gbps, increased digital signal processing (DSP) capabilities, high system integration, and 2nd Gen Intel® Hyperflex™ architecture for a wide range of applications; operation with a CPU such as a quad-core Arm Cortex-A53 processor is beneficial to provide high system integration when implementing embodiments of the present disclosure. Other types of FPGAs can be used to implement embodiments of the present disclosure. "TM" denotes a trade mark, whereas ® denotes a registered trade mark.

In the foregoing, use of artificial intelligence (AI) detectors for performing classification of objects is described. Moreover, as aforementioned, the AI detectors are conveniently implemented using one or more neural networks. Beneficially, the neural networks are implemented in layers, wherein a given layer of a given neural network feeds its outputs to one or more other layers of the neural network in a hierarchical layered manner. A lower layer in the hierarchy is beneficially used for performing the aforementioned first classification operation, and are beneficially implemented in an FPGA, wherein one or more higher layers in the hierarchy are beneficially implemented using computing hardware configured to execute software for the second and/or third classification operations. By such an approach, it is feasible to reconfigure the functionality of the AI detectors in software after having performed a majority of the processing on the FPGA. For many image classification operations, the first few neural network layers are commonly shared by different neural networks to provide a degree of temporally parallel processing. It is the higher few layers of the neural network that actually control what exactly will be the AI task to be performed, for example face recognition, emotion recognition, smile detection, number plate recognition, vehicle type recognition, fruit quality recognition in an automated fruit selection apparatus in agriculture, and so forth.

As aforementioned, at least one of the first, second and third classification operation are implemented using a multi-stage process including, for example, a first stage of normalization and a second stage of comparison. It will be appreciated that data normalisation is a common (optional) pre-processing stage of neural networks, sometimes executed for each of the neural network layers. The data comparison stage typically appears at the output of a neuron, either as part of the neuron non-linear function (for example, from a Rectified Linear Unit—ReLU function) or as part of a general AI system (for example, like thresholding a soft probability value of an object's class, like "80% the object is a car and 20% it is a motorbike", in order to take the final/hard decision, "the object is a car").

Beneficially, the AI detectors are configured, when processing data of objects in different object orientations and/or sizes, the neural network detectors are built to be rotation/size resilient, so that the neural network detectors do not need to perform these operations during runtime. Instead, they use rotated/scaled images during an earlier training phase.

Although use of Kalman filter for performing classification operations is mentioned in the foregoing as an optional manner of implementing embodiments of the disclosure, it will be appreciated other approaches are possible and are a part of the present disclosure. It will be appreciated that a combination of a hierarchical codec and an AI-based classification system are essential features of the embodiments of the present disclosure.

It is to be understood that any feature described in relation to any one embodiment may be used alone, or in combination with other features described, and may also be used in combination with at least one feature of any other of the embodiments, or any combination of any other of the embodiments. Furthermore, equivalents and modifications not described above may also be employed without departing from the scope of the invention, which is defined in the accompanying statements.

The invention claimed is:

1. A method for using a system to classify one or more elements within an input signal, wherein the method comprises:
    receiving a compressed version of the input signal, wherein the compressed version comprises at least a first set of compressed data and a second set of compressed data in a hierarchy, wherein each set of compressed data, when decoded, enables the signal to be reconstructed up to a respective level of quality;
    decoding the compressed version of the signal up to a first level of quality by decoding the first set of compressed data to generate a first reconstructed signal;
    performing a first object classification operation on the first reconstructed signal;
    decoding the compressed version of the signal up to the second level of quality by decoding a second set of compressed data to generate a second reconstructed signal; and
    performing one or more second object classification operations on the second reconstructed signal.

2. A method of claim 1, wherein, when performing the first classification operation, one or more regions of interest in the first reconstructed signal are identified, and wherein the decoding of the compressed version of the signal up to a second level of quality is performed only for those regions of interest.

3. A method of claim 1, wherein the first reconstructed signal is at the same resolution as the second reconstructed signal.

4. A method of claim 1, wherein the first reconstructed signal is at a mutually different resolution as the second reconstructed signal.

5. A method of claim 1, wherein the first classification is performed on a first number of frames in the first reconstructed signal, and the one or more second classifications are performed on a second number of frames in the second reconstructed signal.

6. A method of claim 1, wherein the first classification is performed over a full frame in the first reconstructed signal, and the one or more second classifications are performed over a portion of a frame in the second reconstructed signal.

7. A method of claim 1, wherein the first classification is performed on a first number of colour planes in the first reconstructed signal, and the one or more second classifications are performed on at least a second number of colour planes in the second reconstructed signal.

8. A method of claim 7, wherein the first number of colour planes corresponds to all the planes in the first reconstructed signal, and wherein the second number of colour planes corresponds to a subset of the colour planes in the second reconstructed signal.

9. A method of claim 7, wherein the one or more second classifications are performed also on at least a third number of colour planes in the first reconstructed signal, wherein the colour planes included in the second number of colour planes are mutually different from the colour planes included in the third number of colour planes.

10. A method of claim 9, wherein the first number of colour planes corresponds to three and includes planes Y, U and V, the second number of colour planes corresponds to 1 and includes the plane Y, and wherein the third number of colour planes corresponds to 2 and includes the colour planes U and V.

11. A method of claim 1, wherein the method further comprises:
    decoding the compressed version of the signal up to a third level of quality by decoding a third set of compressed data to generate a third reconstructed signal; and
    performing one or more third classification operations on the third reconstructed signal.

12. A method of claim 11, wherein:
    the first classification is performed on a first number of colour planes in the first reconstructed signal, and the one or more second classifications are performed on at least a second number of colour planes in the second reconstructed signal;
    the one or more second classifications are performed also on at least a third number of colour planes in the first reconstructed signal,
    wherein the colour planes included in the second number of colour planes are mutually different from the planes included in the third number of colour planes; and
    the one or more third classifications are performed on at least a fourth number of colour planes in the third reconstructed signal.

13. A method of claim 11, wherein the third reconstructed signal corresponds to a region of interest of the input signal.

14. A method of claim 1, wherein the first level of quality is lower than the second level of quality, wherein quality is defined as a function of image resolution.

15. A method of claim 1, wherein the second reconstructed signal is generated partially based also on the first reconstructed signal.

16. A method of claim 1, wherein the first classification, one or more second classifications and one or more third classifications are organized in a hierarchical manner, so that the first classification is a coarse classification of some elements in the input signal, and either the one or more second classifications or the one or more third classifications further refine the classification of elements, wherein the method further comprises:
    based on the coarse classification, decoding only those portions of the second set of compressed data which are determined to require a further classification, and generating the second reconstructed signal based on those decoded portions.

17. A method of claim 1, wherein the classification operation is performed using an artificial intelligence (AI) detector arrangement, wherein the artificial intelligence (AI) detector arrangement includes neural network detectors.

18. A method of claim 17, wherein the neural network detectors are implemented such that a lowest neural network layer of the neural network detectors is implemented in at least one FPGA, and one or more higher neural network layers of the neural network detectors are implemented using computing hardware configured to execute a software product.

19. A system that, when in operation, classifies one or more elements within an input signal, wherein the system:
- receives a compressed version of the input signal, wherein the compressed version comprises at least a first set of compressed data and a second set of compressed data in a hierarchy, wherein each set of compressed data, when decoded, enables the signal to be reconstructed up to a respective level of quality;
- decodes the compressed version of the signal up to the first level of quality by decoding a first set of compressed data to generate a first reconstructed signal;
- performs a first object classification operation on the first reconstructed signal;
- decodes the compressed version of the signal up to the second level of quality by decoding a second set of compressed data to generate a second reconstructed signal; and
- performs one or more second object classification operations on the second reconstructed signal.

20. A computer program product comprising a non-transitory computer-readable storage medium having computer-readable instructions stored thereon, the computer-readable instructions being executable by a computerized device comprising processing hardware to:
- receive a compressed version of the input signal, wherein the compressed version comprises at least a first set of compressed data and a second set of compressed data in a hierarchy, wherein each set of compressed data, when decoded, enables the signal to be reconstructed up to a respective level of quality;
- decode the compressed version of the signal up to the first level of quality by decoding a first set of compressed data to generate a first reconstructed signal;
- perform a first object classification operation on the first reconstructed signal;
- decode the compressed version of the signal up to the second level of quality by decoding a second set of compressed data to generate a second reconstructed signal; and
- perform one or more second object classification operations on the second reconstructed signal.

* * * * *